United States Patent
Anderson et al.

(10) Patent No.: US 7,004,696 B2
(45) Date of Patent: Feb. 28, 2006

(54) SUPPLEMENTAL RESTRAINT FOR AUTO-RACK RAILROAD CAR RESTRAINT SYSTEM

(75) Inventors: John D. Anderson, Aurora, IL (US);
Walter J. Peach, South Elgin, IL (US);
Michael K. Burke, Wheaton, IL (US)

(73) Assignee: ZefTek, Inc., Montgomery, IL (US)

( * ) Notice: Subject to any disclaimer, the term of this patent is extended or adjusted under 35 U.S.C. 154(b) by 0 days.

(21) Appl. No.: 11/184,113

(22) Filed: Jul. 18, 2005

(65) Prior Publication Data

US 2005/0281630 A1 Dec. 22, 2005

Related U.S. Application Data

(63) Continuation of application No. 10/644,294, filed on Aug. 20, 2003, now Pat. No. 6,926,480.

(51) Int. Cl.
*B60P 3/06* (2006.01)
(52) U.S. Cl. ............................. 410/30; 410/9; 410/19; 410/49
(58) Field of Classification Search ............... 410/3, 410/4, 7, 8, 9, 19, 30, 31, 32, 42, 47, 48, 410/49, 66, 121
See application file for complete search history.

(56) References Cited

U.S. PATENT DOCUMENTS

| | | |
|---|---|---|
| 1,254,920 A | 1/1918 | Mathias |
| 1,424,957 A | 8/1922 | Van Tilburg |
| 1,776,935 A | 9/1930 | Snyder |
| 2,853,257 A | 9/1958 | Cook |
| 2,858,905 A * | 11/1958 | Fahland ........................ 410/30 |
| 2,895,569 A | 7/1959 | Systrom |
| 3,140,850 A | 7/1964 | Packard |
| 3,157,133 A | 11/1964 | Wojcikowski |
| 3,181,886 A | 5/1965 | Blunden et al. |
| 3,605,954 A | 9/1971 | Wakabayashe et al. |
| 3,972,500 A | 8/1976 | Johnson et al. |
| 4,024,820 A * | 5/1977 | Hlinsky et al. ................. 410/3 |
| 4,031,983 A | 6/1977 | Lentini |
| 4,399,893 A * | 8/1983 | Switzer ........................ 188/32 |
| 4,659,266 A | 4/1987 | Thelen et al. |
| 4,668,140 A | 5/1987 | Blunden |
| 4,674,929 A | 6/1987 | Blunden |
| 4,679,974 A | 7/1987 | Blunden |
| 4,786,223 A | 11/1988 | Bigwood et al. |
| 4,836,726 A | 6/1989 | Robertson et al. |
| 4,838,743 A | 6/1989 | Guezou et al. |
| 4,875,813 A | 10/1989 | Moyer et al. |
| 4,960,353 A | 10/1990 | Thorndyke |

(Continued)

*Primary Examiner*—H. Gutman
(74) *Attorney, Agent, or Firm*—Bell, Boyd & Lloyd LLC

(57) ABSTRACT

A supplemental restraint for a primary vehicle restraint system for an auto-rack railroad car which reduces or eliminates movement of the vehicle in the auto-rack railroad car. The supplemental restraint is adapted to be positioned on a grating between the tire of the vehicle and the primary restraint. One embodiment of the supplemental restraint includes a body and an expander connected to the body. After the primary restraint is locked in place on the grating, the expander of the supplemental restraint is expanded. The expansion causes a more secure engagement between the tire and the primary restraint. This causes a high level of engagement between the tire and the primary restraint system indirectly through the supplemental restraint. The supplemental restraint also maintains a higher contact area on the tire regardless of the position of the primary restraint.

51 Claims, 14 Drawing Sheets

U.S. PATENT DOCUMENTS

| | | |
|---|---|---|
| 4,979,856 A | 12/1990 | Blunden et al. |
| 5,011,347 A | 4/1991 | Bullock |
| 5,106,245 A | 4/1992 | Fritz et al. |
| 5,108,237 A | 4/1992 | Zankich |
| 5,134,868 A | 8/1992 | Bethards |
| 5,137,405 A | 8/1992 | Klein |
| 5,160,223 A | 11/1992 | Seitz |
| 5,239,933 A | 8/1993 | Murphy et al. |
| 5,294,211 A | 3/1994 | Niimura |
| 5,302,063 A | 4/1994 | Winsor |
| 5,312,213 A * | 5/1994 | Winsor ............ 410/9 |
| 5,316,421 A | 5/1994 | Bullock et al. |
| 5,465,814 A | 11/1995 | Ziaylek |
| 5,586,849 A | 12/1996 | Kissel et al. |
| 5,674,033 A | 10/1997 | Ruegg |
| 5,775,858 A | 7/1998 | Bacon |
| 5,785,474 A | 7/1998 | Kinouchi et al. |
| 5,975,818 A | 11/1999 | Burke et al. |
| 6,050,137 A | 4/2000 | Merrill, Sr. |
| 6,139,231 A | 10/2000 | Kissel |
| 6,164,882 A | 12/2000 | Selle |
| 6,164,893 A | 12/2000 | Glomot et al. |
| 6,171,037 B1 | 1/2001 | Andre |
| 6,238,153 B1 | 5/2001 | Karrer |
| 6,276,496 B1 | 8/2001 | Hageman et al. |
| 6,290,029 B1 | 9/2001 | Gubler et al. |
| 6,478,525 B1 | 11/2002 | Hagemann et al. |
| 6,524,053 B1 | 2/2003 | Hahn et al. |
| 6,530,729 B1 | 3/2003 | Tatina |
| 6,585,211 B1 | 7/2003 | Hageman et al. |
| 6,851,523 B1 * | 2/2005 | Gaster ............ 188/32 |
| 6,863,481 B1 * | 3/2005 | Pingel ............ 410/30 |
| 2004/0105733 A1 * | 6/2004 | Hewitt ............ 410/66 |
| 2004/0131438 A1 * | 7/2004 | Winsor ............ 410/30 |

* cited by examiner

SUPPLEMENTAL RESTRAINT FOR AUTO-RACK RAILROAD CAR RESTRAINT SYSTEM

PRIORITY CLAIM

This application is a continuation of, claims priority to and the benefit of U.S. patent application Ser. No. 10/644,294, filed Aug. 20, 2003, now U.S. Pat. No. 6,926,480, the entire contents of which is incorporated herein.

BACKGROUND

The railroad industry employs a variety of railroad cars for transporting products including vehicles such as automobiles and trucks. Auto-rack railroad cars transport newly-manufactured vehicles such as automobiles, vans, and trucks. Auto-rack railroad cars, known in the railroad industry as auto-rack cars, often travel thousands of miles through varying terrain. One typical type of auto-rack car is compartmented, having two or three floors or decks, two side-walls, a pair of doors at each end, and a roof. Newly-manufactured vehicles are loaded into and unloaded from an auto-rack car for transport by a person (i.e., a loader) who drives the vehicles into or out of the auto-rack car. The loader also operates the vehicle restraint system that secures the vehicles in the auto-rack car.

One problem with auto-rack cars is the potential for damage to newly-manufactured vehicles which can occur in the auto-rack car due to the unwanted movement of one or more of the transported vehicles not adequately secured in the auto-rack car. Various restraint or anchoring systems have been developed for securing the vehicles transported in auto-rack cars to prevent movement or shifting of those vehicles during transportation. One type of system employs a "tie down" restraint using chains connected to steel runners in the support surface of the auto-rack car. A ratchet tool is usually required to secure these chains taut. Certain types of these systems utilize winch mechanisms and harnesses which must be fitted over the vehicle tires to restrain movement of the vehicle.

To solve these problems and other disadvantages of prior vehicle restraint systems, a vehicle-restraint or wheel-chocking system for restraining vehicles transported on auto-rack cars was developed. This system is disclosed in detail in U.S. Pat. Nos. 5,239,933 and 5,302,063. This wheel-chocking or restraint system includes a plurality of chock members (referred to herein as "primary restraints") detachably secured to gratings provided on a support surface of the auto-rack car at defined locations. This wheel chocking system was designed to utilize four primary restraints, one associated with each of the four wheels of a vehicle being transported, to provide a balanced restraint relative to the center of gravity of the vehicle and eliminate the effects of longitudinal forces caused by impacts and lateral forces induced by rocking of the auto-rack railroad car in transit.

As illustrated in FIGS. 2 and 3, the primary restraint 32 of this system includes an angled face-plate 34 for alignment with, and restraining movement of, a tire 40 of an associated wheel 42 of the vehicle 44 positioned on the grating 38. The angled face-plate 34 is vertically adjustable to a lower position (shown in FIGS. 2 and 3), an intermediate position, and an upper position (shown in phantom in FIG. 2) to provide chocking for different tire sizes. The angled face-plate 34 is attached to a load-transmitting member 36 which is adapted to transfer the load applied to the face-plate 34 to the grating 38. The primary restraint 32 also includes a paddle-shaped restraining member 39 which contacts the inside surface of the tire to prevent lateral shifting of the vehicle.

While the primary restraint system described above (and described in more detail in U.S. Pat. Nos. 5,239,933 and 5,302,063) has been widely adapted and generally relatively effective in restraining vehicles, such as conventional automobiles, vans, trucks and certain SUVs, a problem has developed in relation to new types of vehicles, currently called "cross-over" vehicles. Cross-over vehicles generally include a truck or SUV-type body mounted on an automobile-type frame. Such vehicles currently include the PONTIAC VIBE vehicle, the TOYOTA MATRIX vehicle and other similar vehicles. These cross-over vehicles have a higher center of gravity and a much lower curb weight than conventional automobiles and SUV's, but include relatively low fenders, moldings and bumpers (compared to certain trucks, vans and SUVs). When cross-over vehicles are loaded in an auto-rack railroad car on the grating of the vehicle restraint system described above, it has been found that the restraint system and, particularly, the primary restraints are not adequately holding these vehicles in place or preventing the movement of the vehicles to a minimum desired level of movement.

This lack of restraint occurs, at least in part, because the adjustable member or face-plate 34 of the restraint cannot be mounted or positioned in the upmost or highest position because the adjustable member will or may interfere with or contact the bumper, fender or molding of the cross-over vehicle as illustrated in phantom in FIG. 2. It should be appreciated that vehicle manufacturers provide extremely particular instructions which warn against any contact or engagement between anything in the auto-rack railroad cars and the new vehicles because the vehicle manufacturers desire to deliver the vehicles to dealers and customers in "perfect" condition. Any damage, such as scratches or dents to the fenders, bumpers, moldings, trim or other parts of the vehicle, could prevent or inhibit a customer from purchasing or taking delivery of the vehicle. Accordingly, vehicle manufacturers prefer that the adjustable member of the primary restraint of the above system not contact and not come close to the fenders, bumpers, trim or moldings of the newly manufactured vehicles as illustrated in the lower position in FIG. 2. The adjustable member must accordingly be placed in the lowest or, at best, the intermediate position when securing certain vehicles such as cross-over vehicles in the auto-rack cars as illustrated in the lowest position in FIG. 2. This causes the face-plate to engage the tire at a lower point on the tire, and accordingly, the vehicle is more likely to be able to jump over or hop the primary restraint if the vehicle is exposed to sufficient forces as illustrated in FIG. 3.

A related problem which can also cause the vehicle to be more likely to jump over or hop the primary restraint is that the primary restraint is sometimes not placed as close to the tire as potentially possible as also illustrated in FIG. 2. One reason for this is that the loaders are in a hurry when they load the vehicles into the auto-rack railroad cars. When the loaders are in a hurry, they tend to place the primary restraint in a position close to the tire without substantially maneuvering the primary restraint to the closest possible position to the tire. This positioning can sometimes leave a substantial gap between the primary restraint and the tire. This gap can allow the vehicle to move and in fact build up speed causing the vehicle to hop or jump the primary restraints.

A similar problem arises because the primary restraint may need to be positioned or spaced at a distance from the tire because the tire is at a position on the grating or relative to the grating that does not allow the primary restraint to be placed in engagement with the tire. The primary restraint must be placed a distance of up to three-quarters of an inch away from the tire due to the position of the grating members or rungs relative to the tire and the locking members of the primary restraint. Again, in such situations, a gap is created allowing the vehicle to hop or jump the primary restraints. This is also illustrated in FIG. 2 where the size of the gap between the tire and the face-plate is approximately half the distance between the rungs of the grating.

This gap problem is compounded because certain vehicle manufacturers require that certain vehicles be transported with the transmission in neutral to prevent damage to the vehicle such as to the transmission of the vehicle. In neutral, the transmission does not stop the vehicles from moving.

It should also be appreciated that the vehicles may jump or hop the primary restraints at a variety of different times. During movement of the train including sudden stoppage of the auto-rack railroad car or severe deceleration of the auto-rack railroad car. Such instances can include sudden stopping for emergencies alone or in combination with slack action. The amount of force on the vehicles being transported relative to the auto-rack car can cause the vehicles to hop or jump over the primary restraints, especially if the tire is engaged by the face-plate at a relatively low point, if the primary restraint is spaced from the tire or if the face-plate is at a low position and spaced from the tire.

More importantly, during loading or unloading in a railroad yard, the auto-rack railroad cars are coupled and decoupled with other railroad cars on a regular basis. During the coupling action, severe jolts of up to 8 to 10 miles per hour can be incurred by the auto-rack railroad car even though regulations (and signs in the yards and on the railroad cars) limit the speed to no more than 4 miles per hour. These jolts can cause extreme force on the vehicles relative to the railroad cars and, thus, cause the vehicles to jump or hop the primary restraints especially if the tire is engaged by the face-plate at a relatively low point or if the primary restraint is spaced from the tire. When a vehicle hops or jumps a restraint, the vehicle may engage another vehicle in the railroad car or one or more end doors of the railroad car. There have been significant recorded instances of this type of damage to vehicles and especially cross-over vehicles in auto-rack railroad cars in railroad yards in recent years. As indicated above, such damage to the vehicles necessitates the replacement of the damaged part and potentially other parts of the vehicle. This damage is extremely expensive for vehicle manufacturers which charge the railroads for such damage.

This problem is compounded for vehicle manufacturers when the vehicle damaged is a specially ordered vehicle (instead of a stock vehicle) for a specific customer. The customer can wait one, two, three or more months for a specially ordered vehicle. If the specially ordered vehicle is damaged in transit, the customer may need to wait for another specially ordered vehicle to be manufactured. This can harm the dealer's and manufacturer's businesses.

Additionally, the railroads often incur significant expenses because the end doors of the auto-rack railroad cars need to be repaired. During such repairs, these cars must be taken out of service.

The primary restraints are also often damaged when the vehicles jump the primary restraints or run into the primary restraints. The railroads have to replace these damaged primary restraints or have these damaged primary restraints repaired. This causes additional expenses which are incurred by the railroads.

It should thus be recognized that while the restraint system described above, which has been widely commercially implemented, provides certain restraint for vehicles being transported in auto-rack cars, in certain instances this restraint system does not adequately protect the vehicles or prevent the movement of the vehicles and thus prevent damage to the vehicles, the auto-rack railroad cars and the primary restraints. The automobile industry and the railroad industry have sought improvements for this restraint system. Accordingly, there is a need for an improvement to the restraint system described above which is easy to install and remove and assists the primary restraints which are adapted to be attached to the gratings to hold the vehicles more securely.

SUMMARY

The present invention solves the above problems by providing a supplemental or auxiliary restraint for an auto-rack railroad car which reduces or eliminates the movement of the vehicles being transported in the auto-rack car. The present invention provides a supplemental restraint which is adapted to co-act with the restraint system and, particularly, with each of the primary restraints to more fully secure a vehicle being transported in an auto-rack railroad car.

The supplemental restraint of the present invention is adapted to be positioned between the tire of the vehicle and the primary restraint. In one embodiment, the supplemental restraint includes a first or tire engaging surface or member, a second or primary restraint engaging surface or member and an expander or adjuster which causes the movement of the first or tire engaging surface or member and the second or primary restraint engaging surface or member between a non-expanded position and at least one expanded position. In the non-expanded position, the first or tire engaging surface or member is closer to the second or primary restraint engaging surface or member, and in the expanded position, the first or tire engaging surface or member is further away from the second or primary restraint engaging surface or member. Moving the supplemental restraint into the expanded position causes the first or tire engaging surface or member to engage the tire and the second or primary restraint engaging surface or member to engage the face-plate of the primary restraint. This securely locks the tire in place. It should be appreciated that the present invention may have one or more intermediate expanded positions which compensate for the different size gaps between the tire and the face-plate of the primary restraint.

In one embodiment of the present invention, the supplemental restraint of the present invention is adapted to be positioned on the grating between the tire of the vehicle and the primary restraint. More specifically, after a vehicle is loaded in an auto-rack car on the grating, the supplemental restraint of the present invention is first positioned directly adjacent to and in engagement with the tire. The primary restraint system is then positioned adjacent to the opposite side of the supplemental restraint. After the primary restraint is locked in place on the grating, the supplemental restraint, or an expandable portion thereof, is expanded. The expansion causes a more secure engagement between the tire and the primary restraint. This causes a high level of engagement between the tire and the restraint system indirectly through the supplemental restraint of the present invention. This prevents movement of the tires of the vehicles and, thus, facilitates a more effective overall vehicle restraint system.

In one embodiment, the supplemental restraint of the present invention includes a body and an expander connected to the body. The body includes a mounting member adapted to be positioned on the grating of the restraint system. The body also includes a tire-engaging member or tire engager connected to and extending upwardly from the mounting member. The tire-engaging member or tire engager is curved in a suitable manner for engagement with the treaded surface of the tire. The tire engager is formed to engage a significant portion of the tire, and specifically to extend between the tire and the adjacent fender, molding or trim In one embodiment, the expander is connected to the body and, in one preferred embodiment, connected to the tire engager. The expander is adapted to transversely extend from the tire engager and cause the tire engager to more securely engage the tire. In one embodiment, the outer surface or primary restraint engaging surface of the expander is adapted to engage the face-plate of the primary restraint when in an expanded position. In an alternative embodiment, the body or part of the body is suitably expandable.

In one embodiment, the expander includes a moveable adjustment or expanding member adapted to co-act with a base connected to the tire engager. The adjusting or expanding member in one embodiment moves, such as by rotating from an unexpanded or closed position (i.e., closer to the tire engager), to a fully expanded or fully open position (i.e., further from the tire engager). In one embodiment, the expander is adapted to be positioned in one, or a plurality of, partially expanded positions between the closed or non-expanded position and the fully open or fully expanded position, and is adapted to be releaseably locked in each such expanded position.

In one embodiment, the supplemental restraint includes at least one handle which is connected to the movable adjusting or expanding member of the expander. The handle enables a user to move the movable adjusting or expanding member between the non-expanded and fully expanded positions (including any partially expanded positions there between). In one embodiment, two or more handles are connected to the movable adjusting or expanding member for this purpose. In a further embodiment, the handle(s) are removably attached to the movable member. It should be appreciated that other suitable arrangements are possible for the handle and the movement of the movable adjusting or expanding member between the expanded and non-expanded positions in accordance with the present invention.

It should also be appreciated that when the movable adjustment or expanding member is moved from the non-expanded position to the fully expanded position (or one of the intermediate expanded positions), this causes the mounting member and the tire engager of the supplemental restraint to move closer to the tire and, therefore, eliminate any gap, space or slack between the tire and the tire engager.

It should be appreciated that a supplemental restraint of the present invention is preferably used with each primary restraint system which is employed to secure the vehicle in place. For certain vehicles, only two primary restraints and two supplemental restraints (on opposing tires on opposite sides of the vehicle) are employed, and, for most vehicles, four primary restraints and four supplemental restraints are employed (i.e., one for each tire).

It is, therefore, an advantage of the present invention to provide a supplemental restraint for a restraint system for a vehicle transported in an auto-rack railroad car.

Other objects, features and advantages of the present invention will be apparent from the following detailed disclosure, taken in conjunction with the accompanying sheets of drawings, wherein like reference numerals refer to like parts.

DETAILED DESCRIPTION OF THE INVENTION

Figure 1:
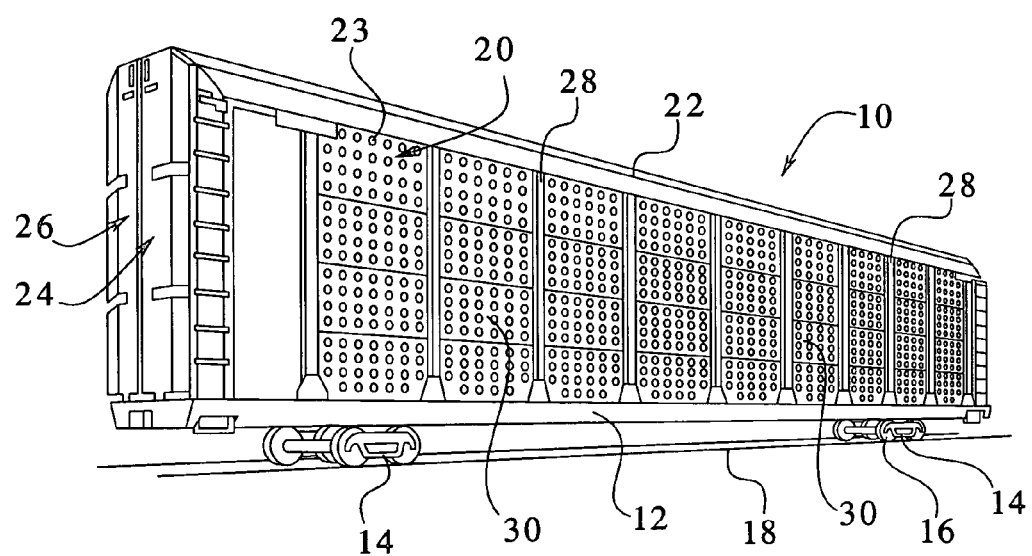
FIG. 1 is a perspective view of an auto-rack railroad car adapted to transport a plurality of vehicles.
Figure 2:
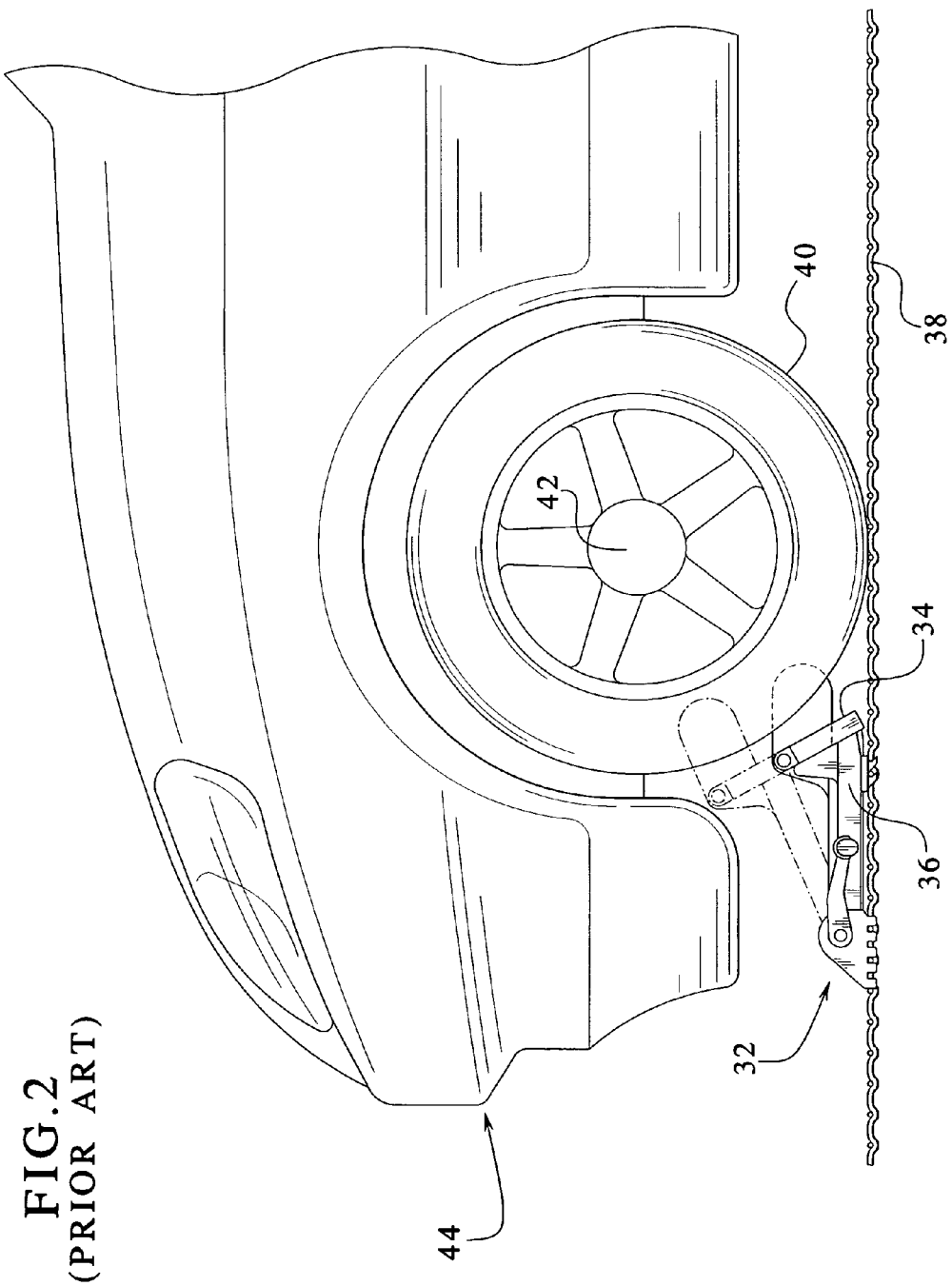
FIG. 2 is a side view of a vehicle and known restraint system in an auto-rack railroad car illustrating the grating of the restraint system on which the vehicle rests, the primary restraint releasably attached to the grating, wherein the primary restraint is illustrated with the face-plate in the lowest position and in phantom in the highest position which would interfere with the fender of the vehicle.
Figure 3:
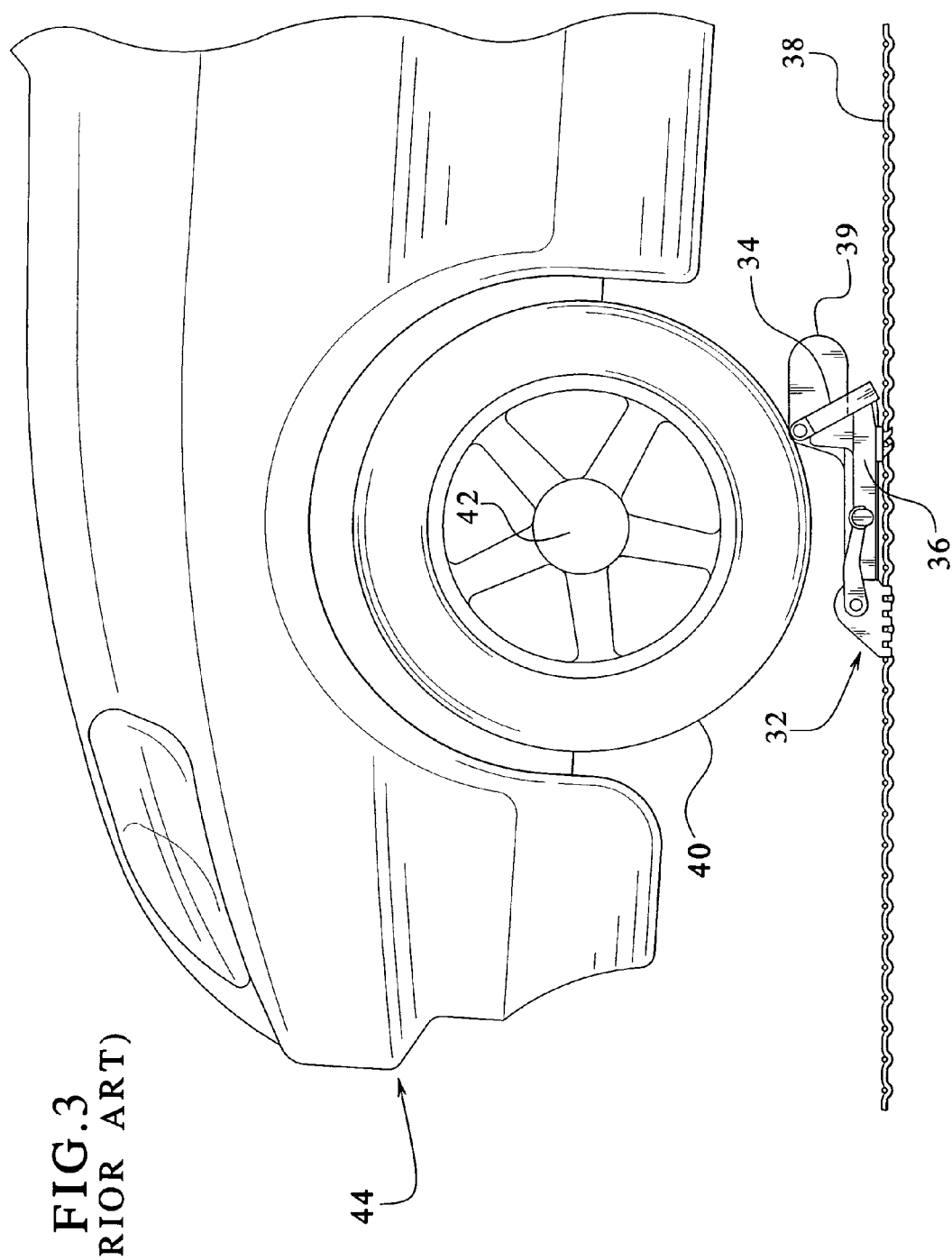
FIG. 3 is a side view of a vehicle which has jumped the primary restraint having the face-plate in the lowest position.
Figure 4:
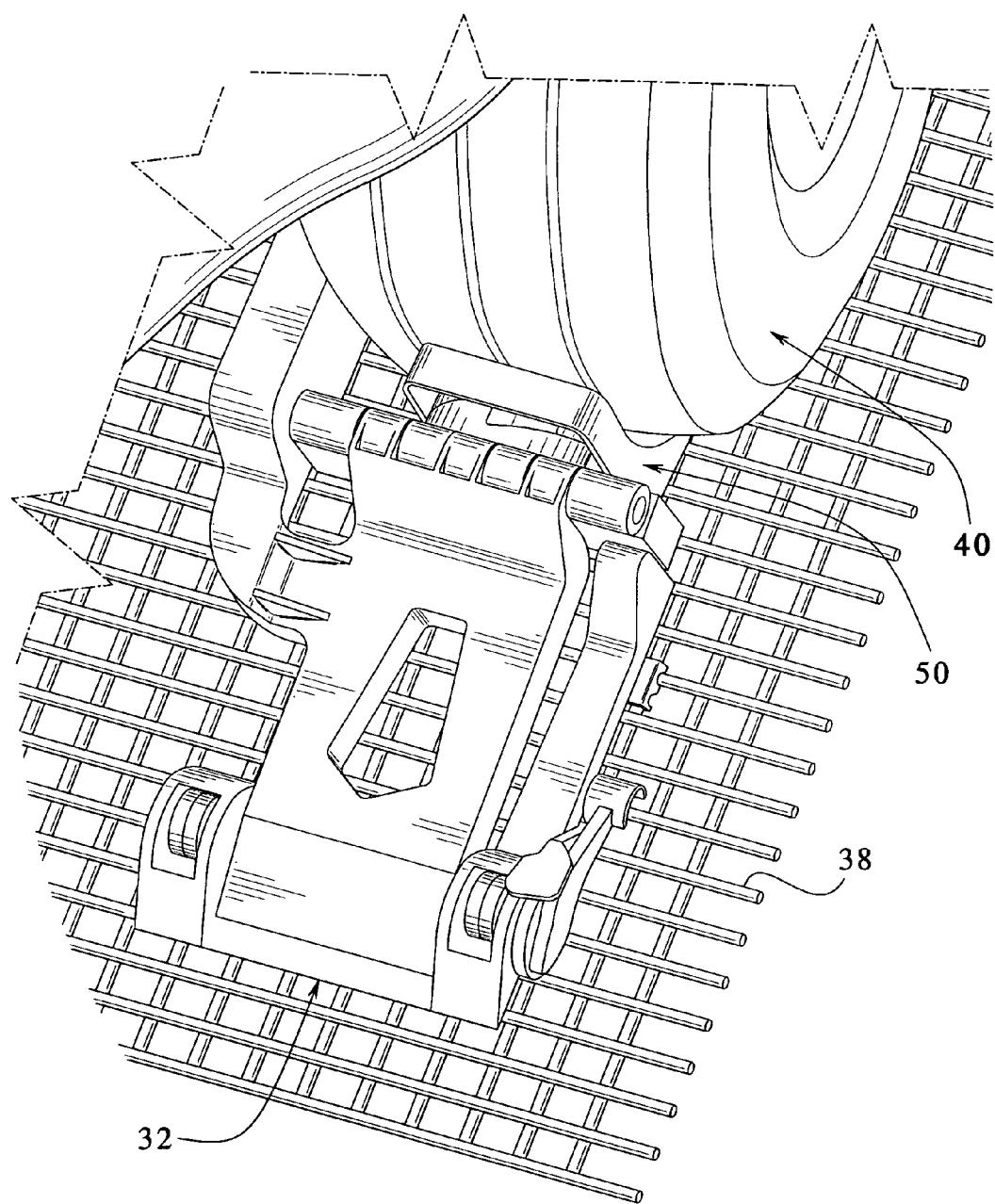
FIG. 4 is a fragmentary top perspective view of the supplemental restraint of one embodiment of the present invention positioned on the grating between the tire of the vehicle and the primary restraint, wherein the supplemental restraint is illustrated in the non-expanded position.

Referring now to the drawings, and, particularly, to FIG. 1, a typical auto-rack railroad car 10 includes a frame 12 supported by trucks 14, each of which have several wheels 16 which roll along railroad tracks 18. The frame 12 supports two sidewalls 20 and a roof 22. The auto-rack car 10 includes a pair of co-acting clamshell doors 24 and 26 mounted on each end of the auto-rack car 10. The doors 24 and 26 are opened to facilitate the loading and unloading of vehicles into and out of the auto-rack car 10 and are closed during transport or storage of the vehicles.

The sidewalls 20 include a series of steel vertical posts 28 which are mounted on, and extend upwardly from, the frame 12. The roof 22 is mounted on, and supported by, these vertical posts. The vertical posts are evenly spaced along the entire length of both sidewalls 20 of the auto-rack car 10. A plurality of rectangular galvanized steel side wall panels 30 which extend horizontally and are vertically spaced apart are mounted between each pair of vertical posts 28. These side wall panels are supported at their corners by brackets (not shown) that are suitably secured to the vertical posts. The average side wall panel has a multiplicity of round sidewall panel holes 23. These side wall panel holes 23 provide the auto-rack car with natural light as well as proper ventilation. Proper ventilation prevents harm from the toxic vehicle fumes to the person or persons loading or unloading the vehicles into or out of the auto-rack car.

The auto-rack car may be a tri-level car having first, second and third levels. Normally, eighteen passenger vehicles can be transported in a tri-level auto-rack car, six on each level. The auto-rack car can also have two levels for vehicles instead of three. The bi-level auto-rack car has a lower level and an upper level. The bi-level auto-rack car is generally used to transport larger vehicles, such as vans, mini-vans, pickup trucks, four-by-four and cross-over vehicles. The bi-level auto-rack car can usually transport twelve of these vehicles, six on each level. The auto-rack car may also be a single-level car.

Figure 5:
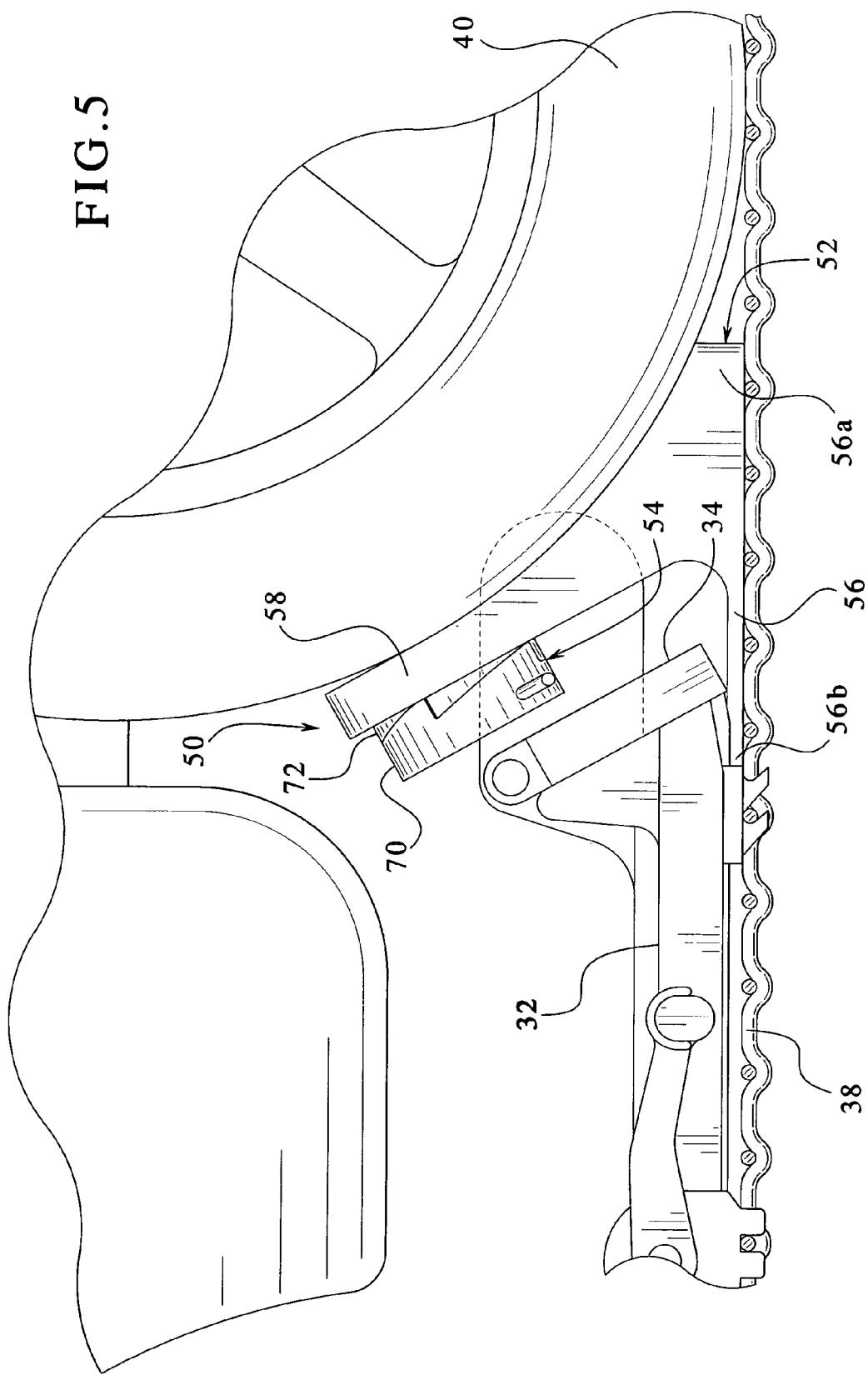
FIG. 5 is a fragmentary side elevation view of the supplemental restraint of the embodiment of FIG. 4 mounted on the grating between the tire of the vehicle and the primary restraint, wherein the supplemental restraint is illustrated in the non-expanded position.
Figure 6:
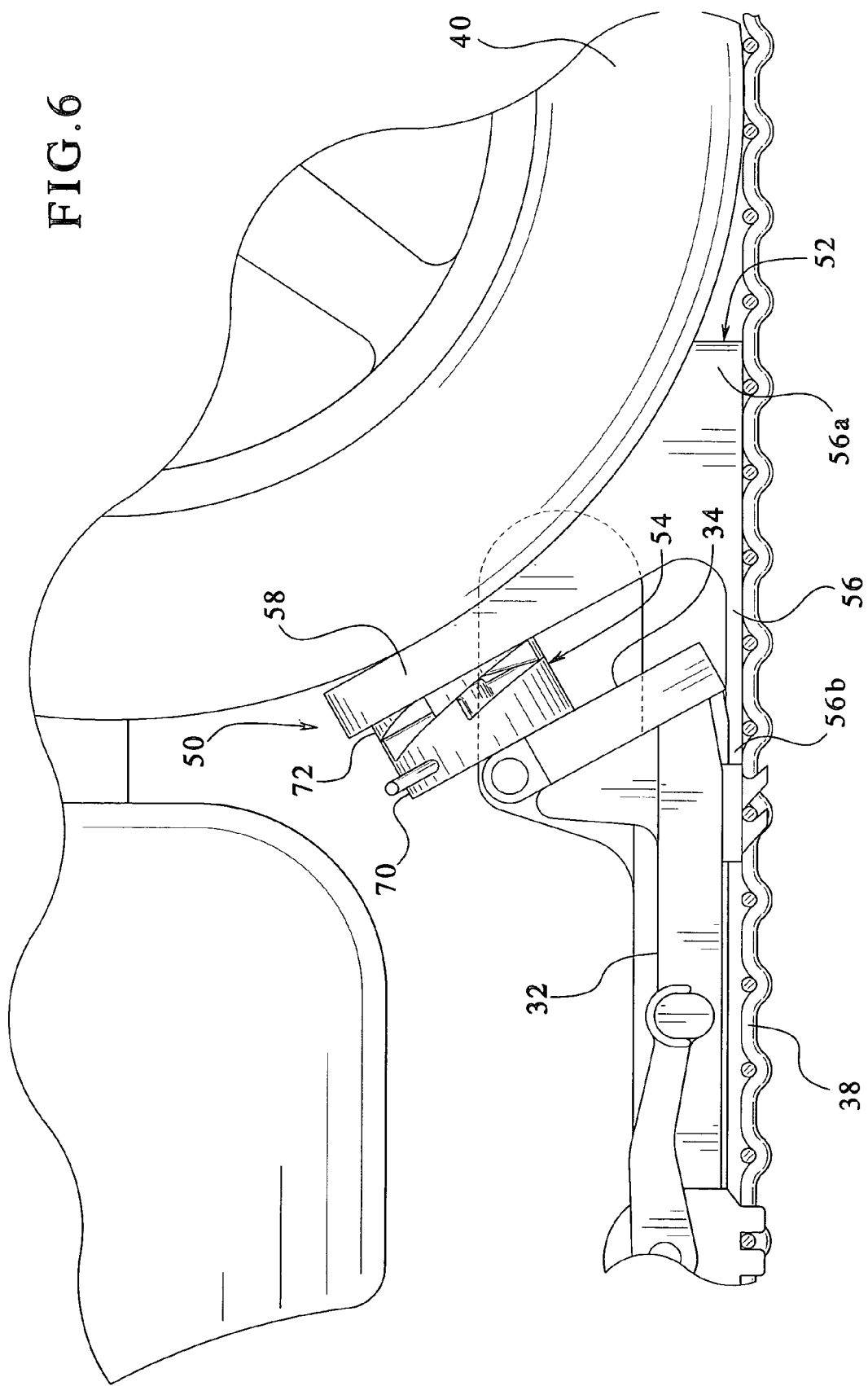
FIG. 6 is a fragmentary side elevation view of the supplemental restraint of the embodiment of FIG. 4 mounted on the grating between the tire of the vehicle and the primary restraint, wherein the supplemental restraint is illustrated in an expanded position such that the tire engaging surface is in engagement with the tire and the primary restraint engaging surface is in engagement with the face-plate of the primary restraint.
Figure 7:
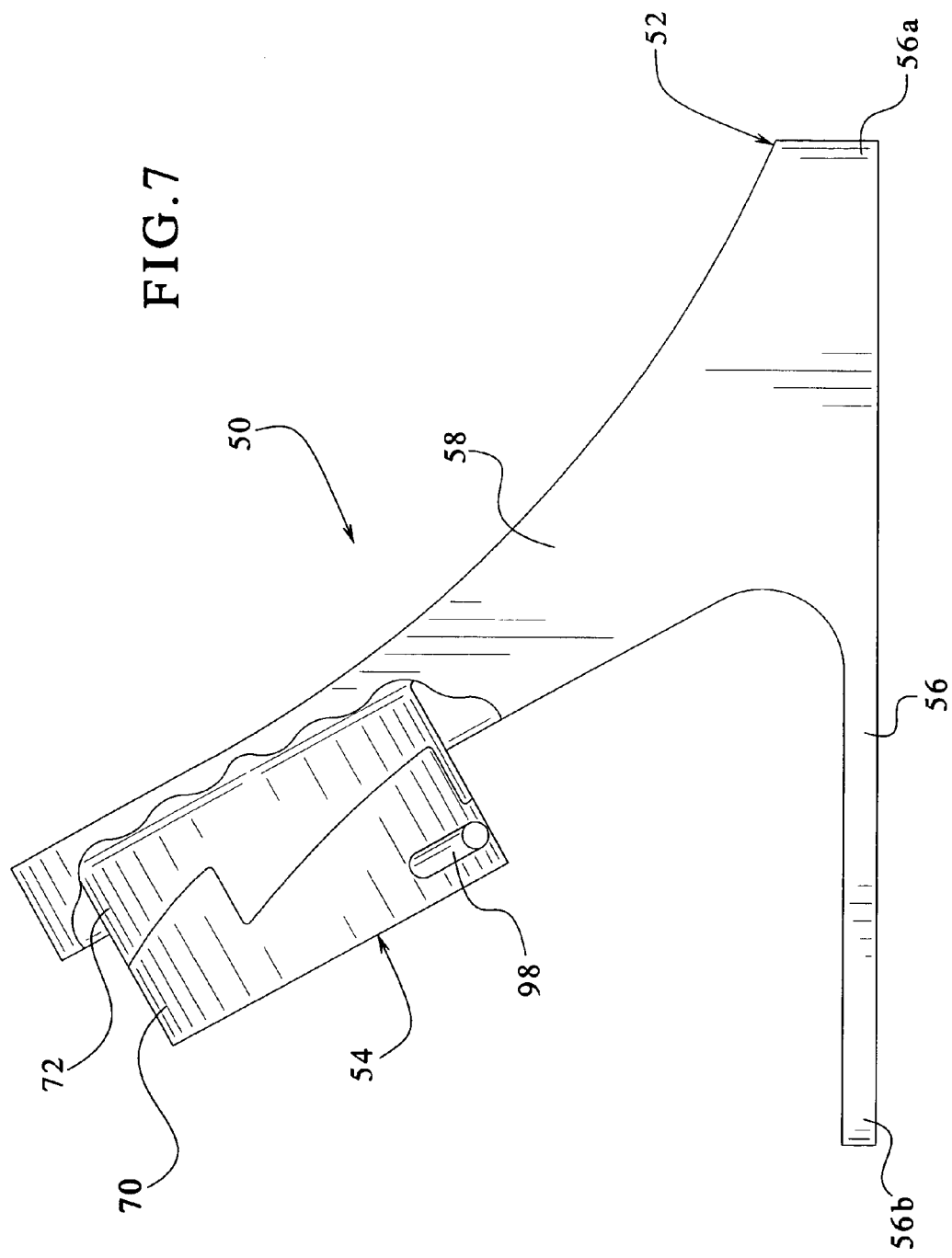
FIG. 7 is a side elevation view of the supplemental restraint of the embodiment of FIG. 4 illustrated in the non-expanded position, and having a portion broken away to facilitate illustration of the base of the expander.
Figure 8:
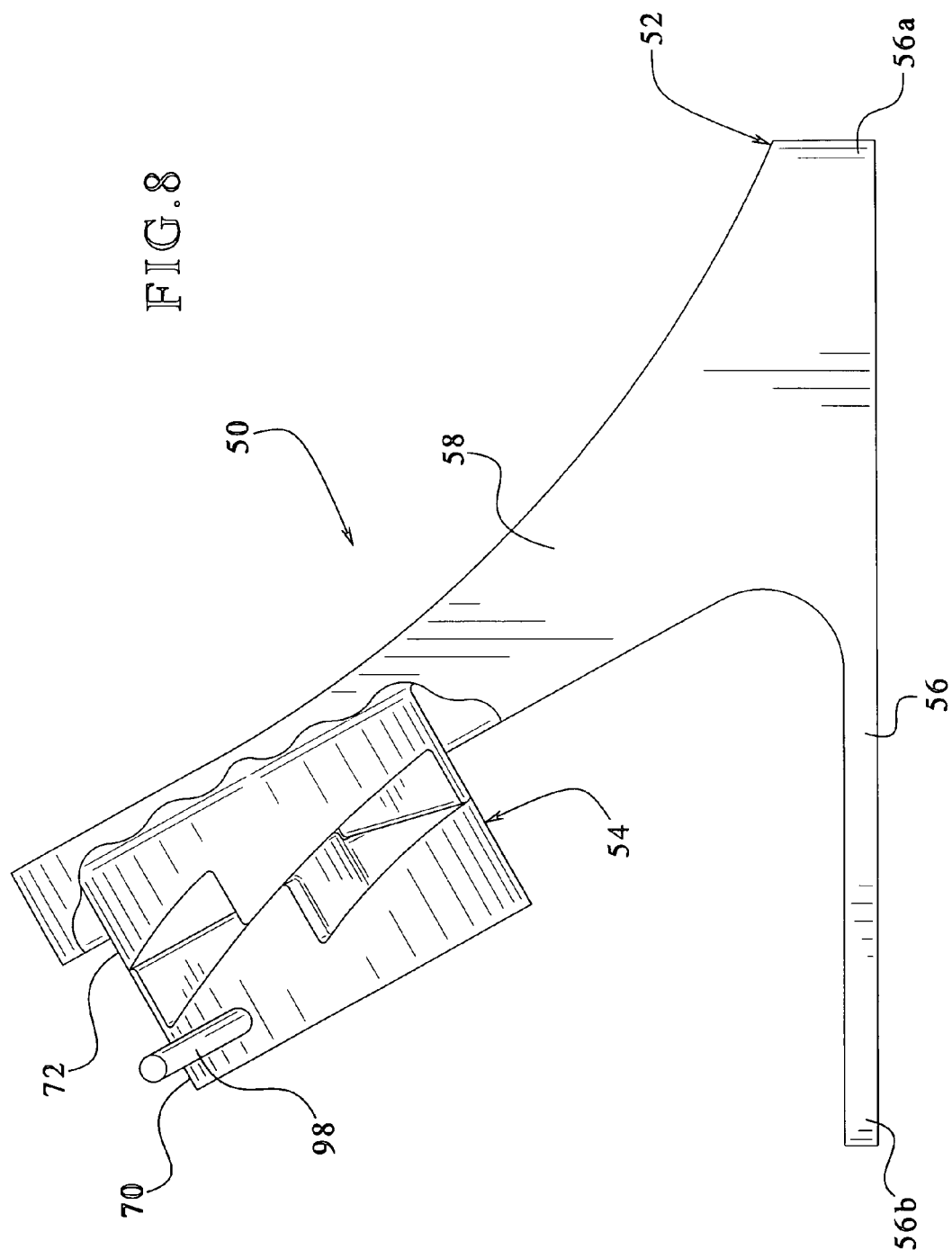
FIG. 8 is a side elevation view of the supplemental restraint of the embodiment of FIG. 4 illustrated in the fully expanded position, and having a portion broken away to facilitate illustration of the base of the expander.
Figure 9:
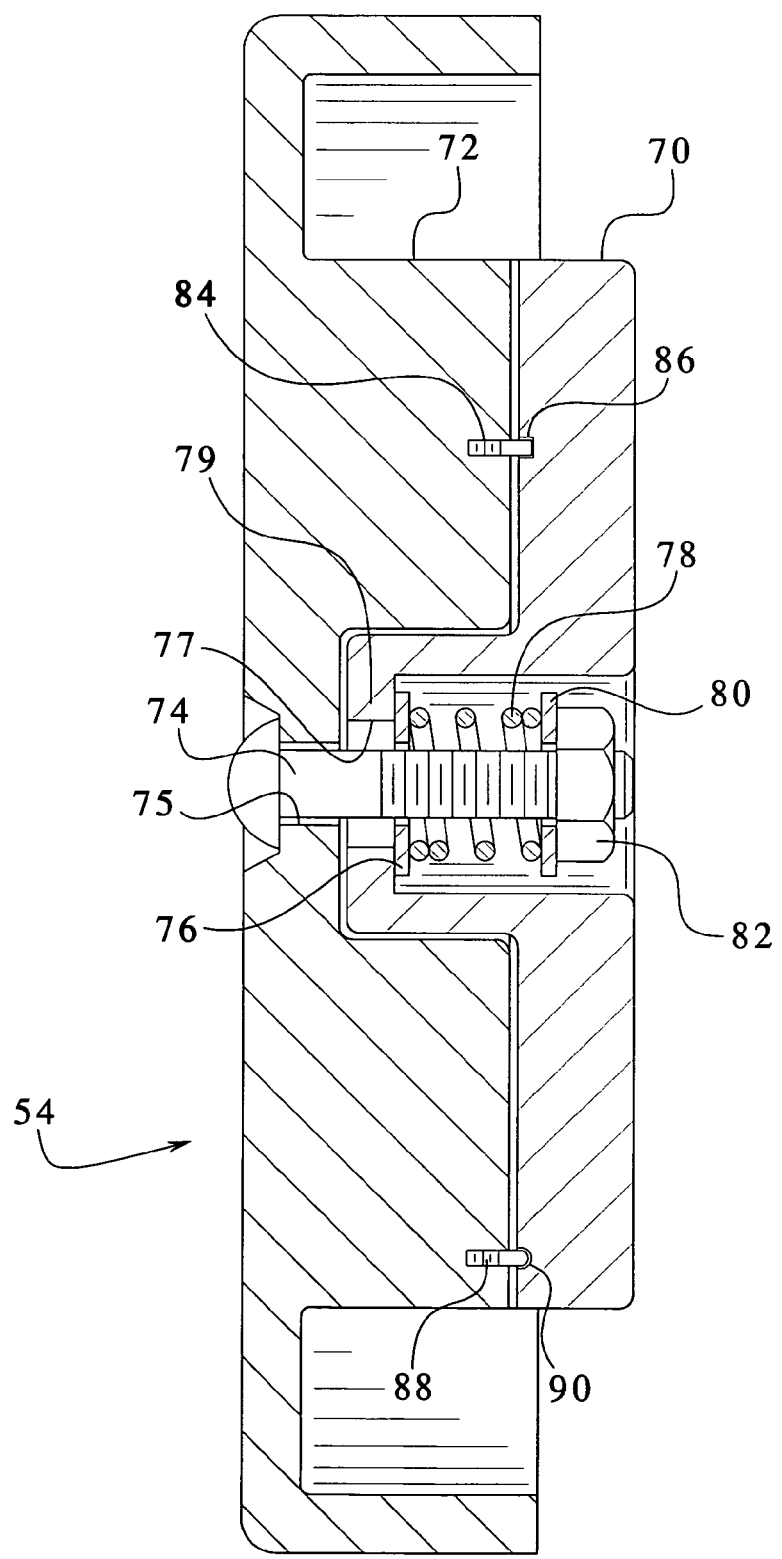
FIG. 9 is a cross-sectional view taken substantially through the expander of in the non-expanded position
Figure 10:
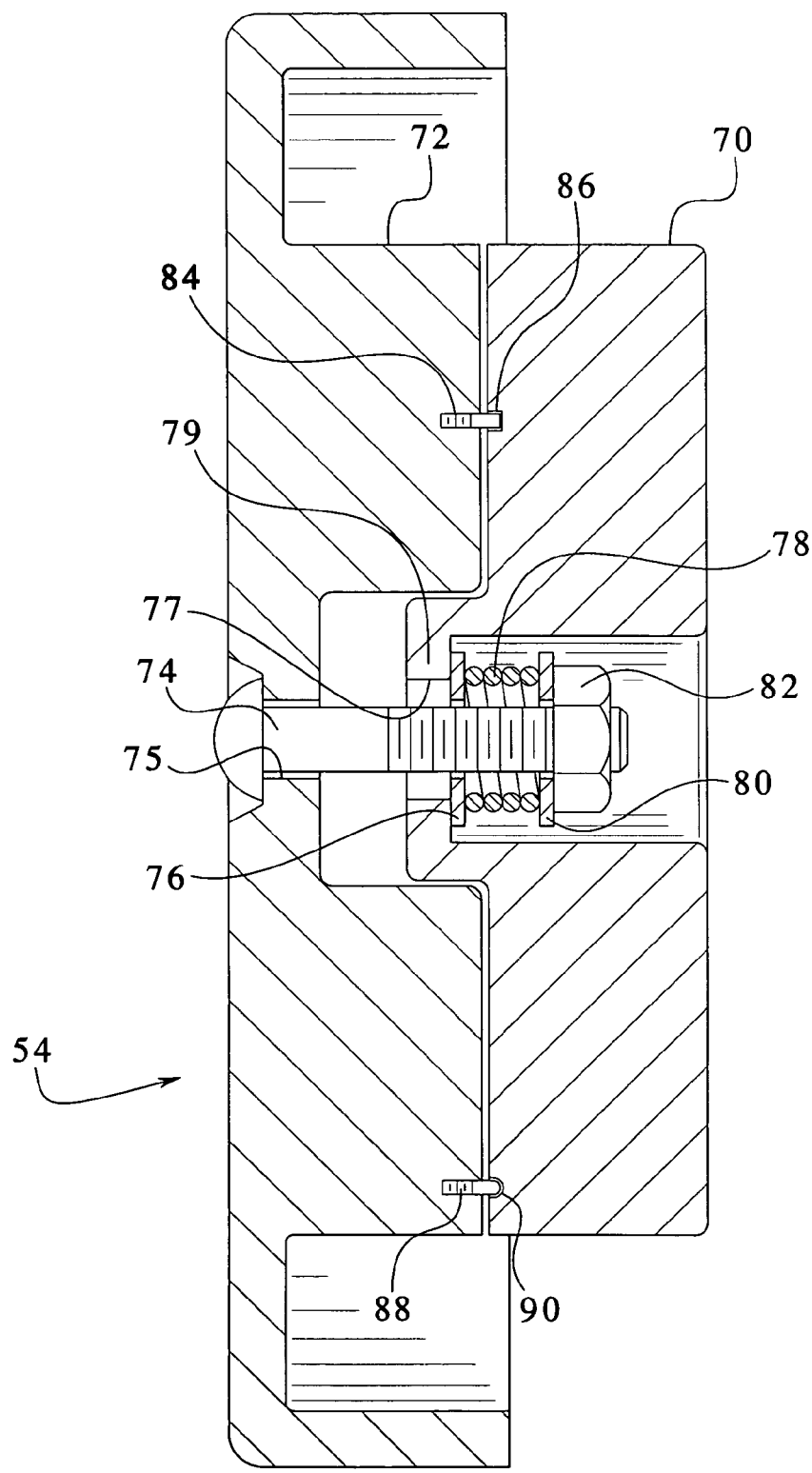
FIG. 10 is a cross-sectional view taken substantially through the expander in the expanded position.
Figure 11:
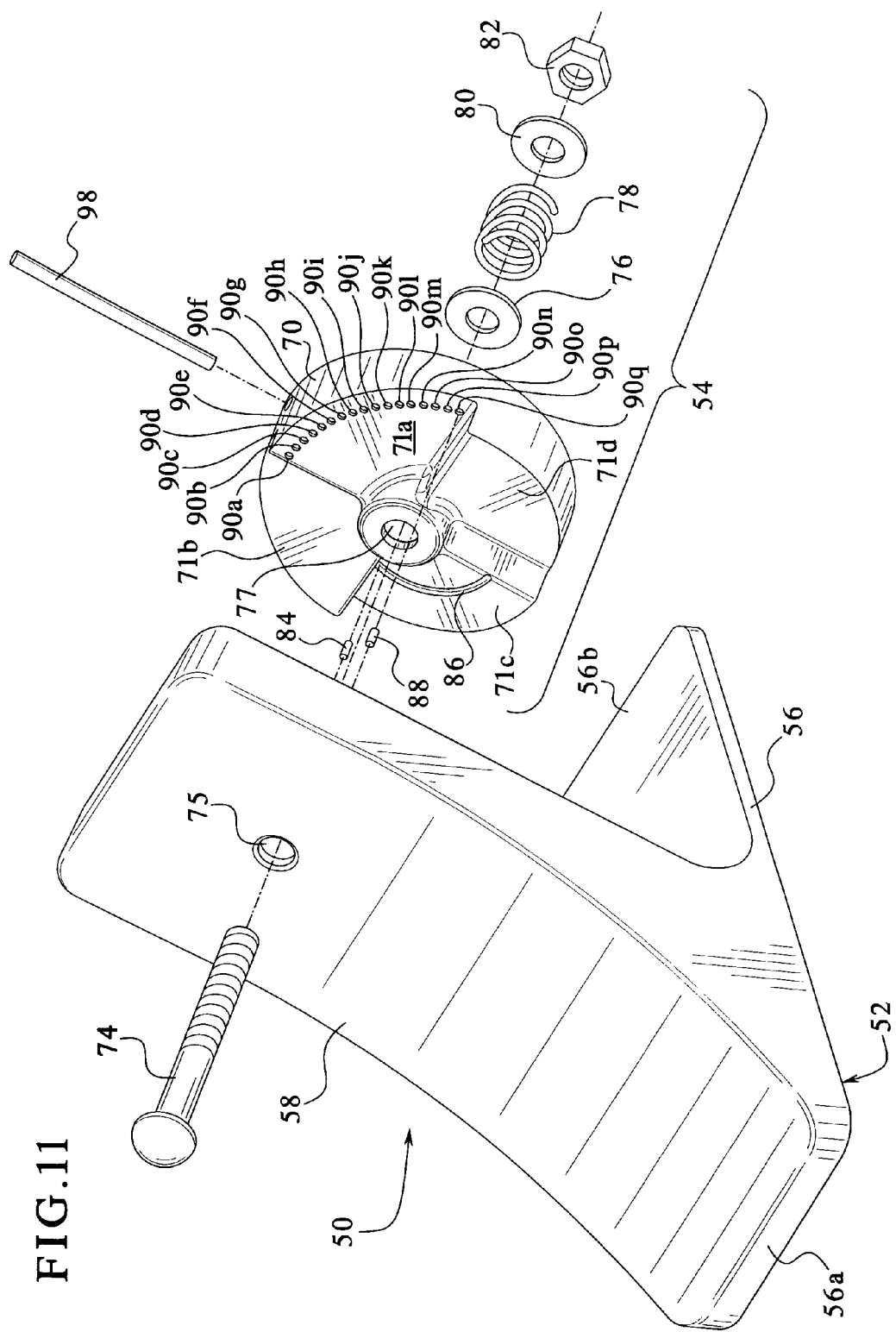
FIG. 11 is an enlarged exploded front-perspective view of the supplemental restraint of the embodiment of FIG. 4 illustrating the adjusting or expanding member of the expander and a handle for the expanding member.

Referring now to FIGS. 4 to 12, the supplemental restraint of one embodiment of the present invention, generally indicated by numerical 50, is illustrated in the non-expanded position in FIGS. 4, 5, 7 and 9 and in the fully expanded position in FIGS. 6, 8 and 10. The supplemental restraint 50 of the illustrated embodiment of the present invention includes a body 52 and an expander or expansion member 54 connected to the body 52.

In the illustrated embodiment, the body 52 includes a mounting member 56 adapted to be positioned on the grating 38 of the restraint system. The mounting member 56 includes a forward section 56a and a rear section 56b. The rear section 56b is suitably sized and shaped to extend under the primary restraint when in the mounted position, as illustrated in FIGS. 5 and 6. This provides substantial support for the supplemental restraint 50 and prevents the backward rotation of the supplemental restraint 50 when the supplemental restraint system is engaged by the tire 40 or the tire applies force to the supplemental restraint 50.

Figure 13:
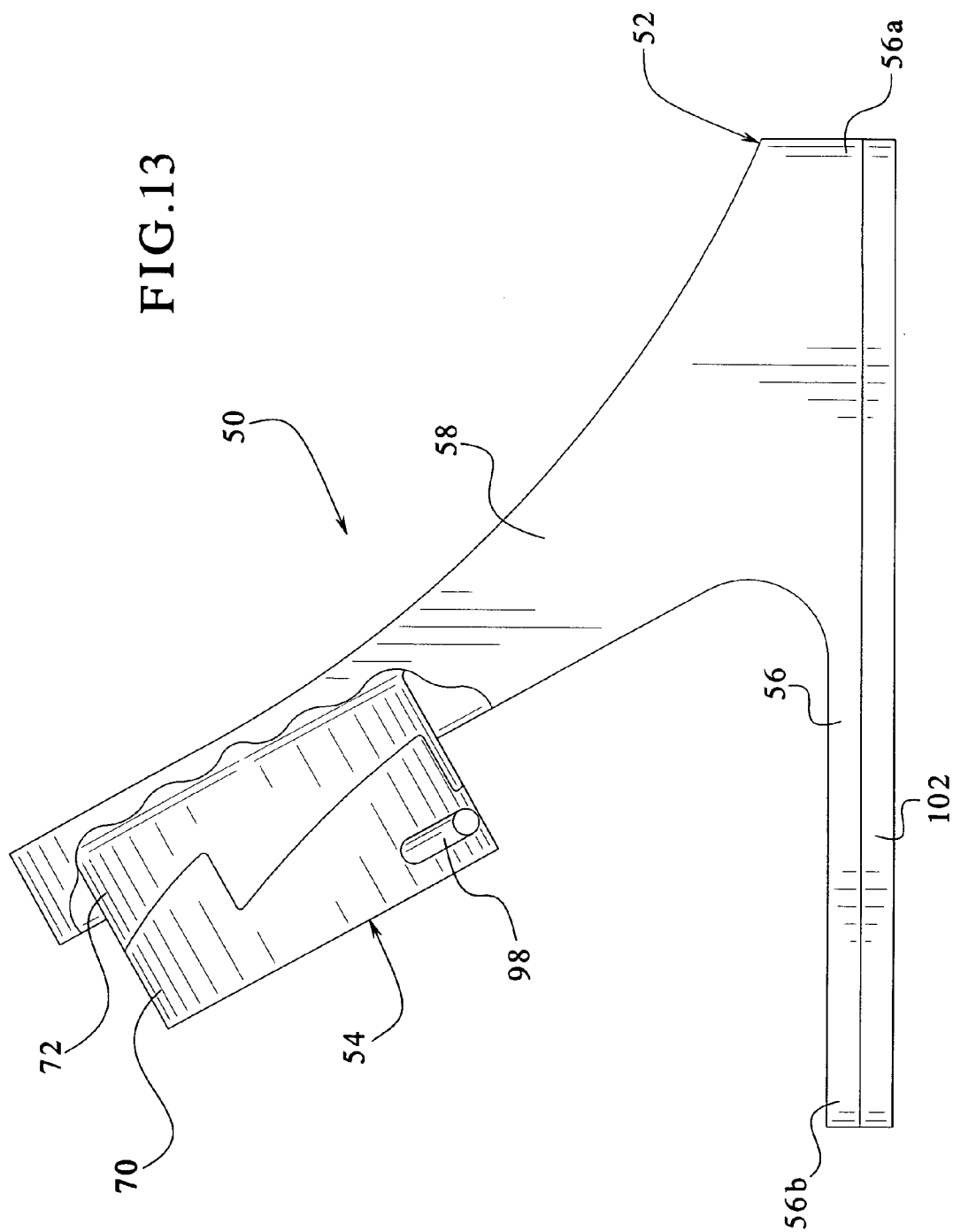
FIG. 13 is a side elevation view of the supplemental restraint of one embodiment of the present invention illustrating the pad attached to the bottom of the mounting member.

In one embodiment, a rubber mounting pad 102 shown in FIG. 13 is suitably attached to the bottom of the mounting member 56 to increase the frictional engagement between the bottom of the mounting member 56 and the grating 38. Since in one embodiment, the grating 38 and the mounting member 56, are both metal, the rubber pad increases the friction between the bottom of the mounting member 56 and the grating 38 and reduces unwanted sliding of the supplemental restraint 50 relative to the grating 38. The mounting pad also functions to reduce or eliminate wear between the supplemental restraint and the grating.

Figure 12:
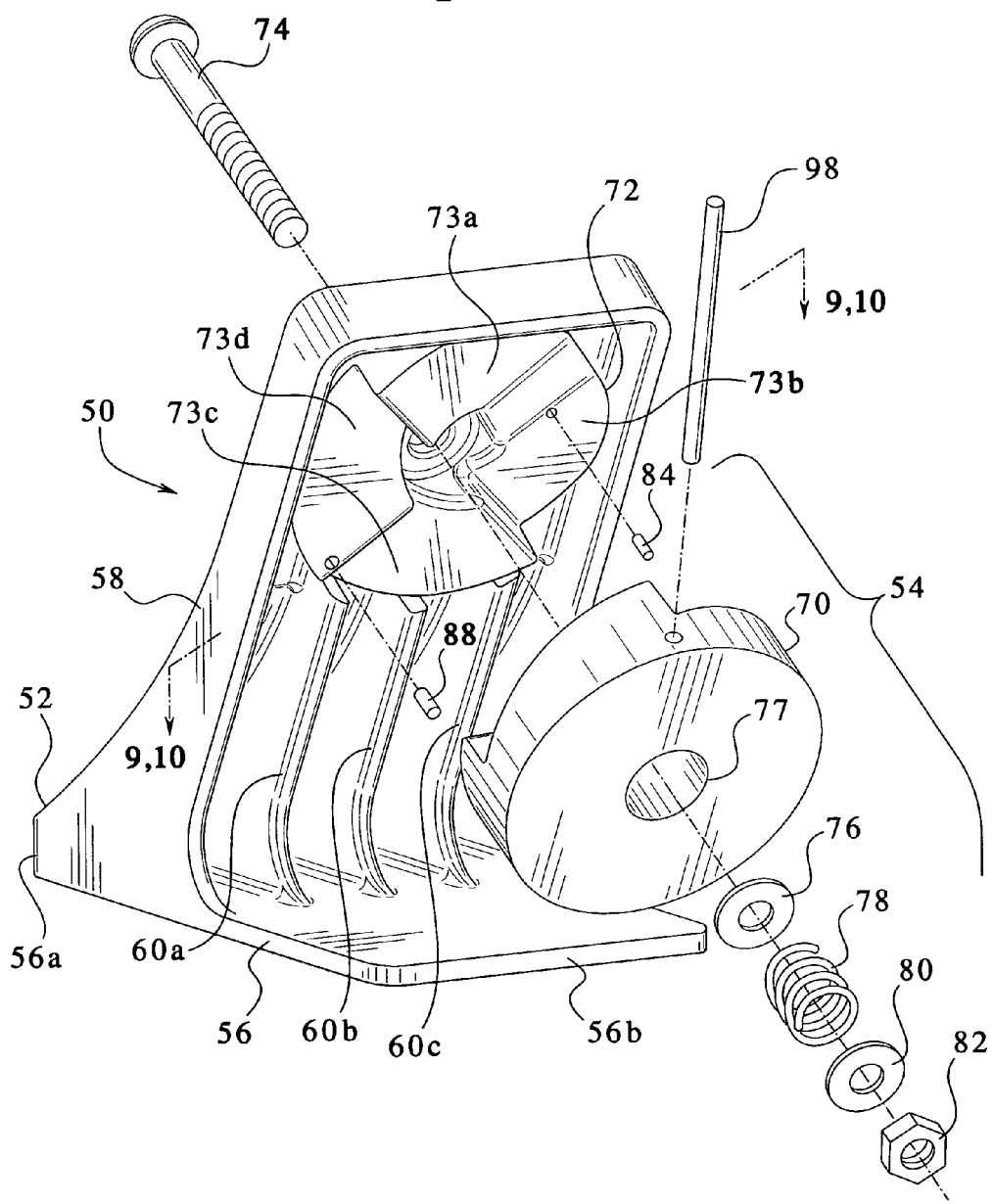
FIG. 12 is an exploded rear-perspective view of the supplemental restraint of the embodiment of FIG. 4 illustrating the base of the expander, the adjusting member of the expander and a handle for the expanding member.

In the illustrated embodiment, the body 52 includes a tire-engaging member or tire engager 58 extending upwardly from the mounting member 56. The tire-engaging member or tire engager 58 is curved in a suitable manner or has a concave shape for engagement with the treaded surface of the vehicle tire 40 which keeps the profile close to the tire and away from the fenders, body panels and trim of the vehicle. As best illustrated in FIG. 12, in one embodiment of the body 52, the body and/or the tire engager includes a plurality of spaced-apart braces or supports such as braces or supports 60a, 60b and 60c which provide structural rigidity to the tire engager and the entire body of the supplemental restraint. Other suitable configurations are contemplated by the present invention. It should be appreciated that the tire engaging surface or member can extend along a significant portion of the tire between the tire and an adjacent fender, molding or trim.

The expander 54 in the illustrated embodiment is connected to the tire engager 58. The expander 54 is operable to extend substantially transversely from the tire engager 58 as illustrated in FIG. 6 to cause the tire engager 58 to more securely engage the tire 40. The expander 54 is adapted to engage the face-plate 34 of the primary restraint 32 when in an expanded position. More specifically, the expander in the illustrated embodiment includes a primary restraint engaging or surface member adapted to engage at least a portion of the face-plate of the primary restraint.

In the illustrated embodiment, the expander 54 includes a moveable adjusting or expanding member 70 adapted to co-act with a base 72 connected to the tire engager 58. The adjusting or expanding member 70 in the illustrated embodiment is adapted to move counter-clockwise by rotating from an unexpanded position, as illustrated in FIGS. 5, 7 and 9, to a fully expanded position, as illustrated in FIGS. 6, 8 and 10, and to move clockwise from the fully expanded position to the non-expanded position. It should be appreciated that the arrangement of movement could be reversed in an alternative embodiment. In the illustrated embodiment, the expander 54 is also adapted to be positioned in each of a plurality of partially expanded positions between the non-expanded position and the fully expanded position and is adapted to be releaseably locked in each such position.

In the illustrated embodiment, the supplemental restraint 50 includes a removable handle 98 which is connected to the movable adjusting or expanding member 70 of the expander 54. The handle 98 enables a user to move the movable adjusting or expanding member between the non-expanded and fully expanded position (including to any of the partially expanded positions therebetween). In one embodiment, the handle is removably attached to the expanding member 70. It should be appreciated that other suitable arrangements are possible for the handle and the movement of the movable adjusting or expanding member between the expanded and non-expanded positions in accordance with the present invention.

In the illustrated embodiment, the expanding member 70 includes a plurality of steps or mating surfaces 71a, 71b, 71c and 71d which are formed and sized to co-act or mate with steps or mating surfaces 73a, 73b, 73c and 73d of the base 72. This arrangement of co-acting steps cause the expanding member 70 to transversely extend away from the base 72 when the expanding member is rotated in a counter-clockwise manner.

In the illustrated embodiment, the expanding member 70 is attached to the base 72 by a biasing assembly including a bolt 74, a first washer 76, a spring 78, a second washer 80 and a nut 82. The bolt 74 is positioned through an opening 75 defined in the tire engager 58 or the base 72 of the tire engager and through an opening 77 defined in the expanding member 70. The first washer 76 engages the lip 79 of the expanding member which defines opening 77, the spring 78 is journaled about the bolt and has one end engaging the first washer 76, the second washer 80 engages the other end of the spring and the nut 82 is secured to the bolt 74. This arrangement causes the expanding member 70 to be biased toward the base 72 to a desired extent. It should be appreciated that other suitable biasing apparatus or arrangements may be implemented in accordance with the present invention.

The expander 54 of the illustrated embodiment also includes a guide mechanism including a guide member or pin 84 and a guide area or slot 86 adapted to receive the guide member or pin 84. This mechanism or arrangement assists in controlling the movement or rotation of the expanding member 70 relative to the base 72 and prevents the expanding member from rotating too far such as past ninety degrees in the illustrated embodiment. It should be appreciated that other suitable guide mechanisms can be employed in the present invention. For instance a pipe or tube can be positioned adjacent to the spring to prevent the rotation past ninety degrees.

Figure 14:
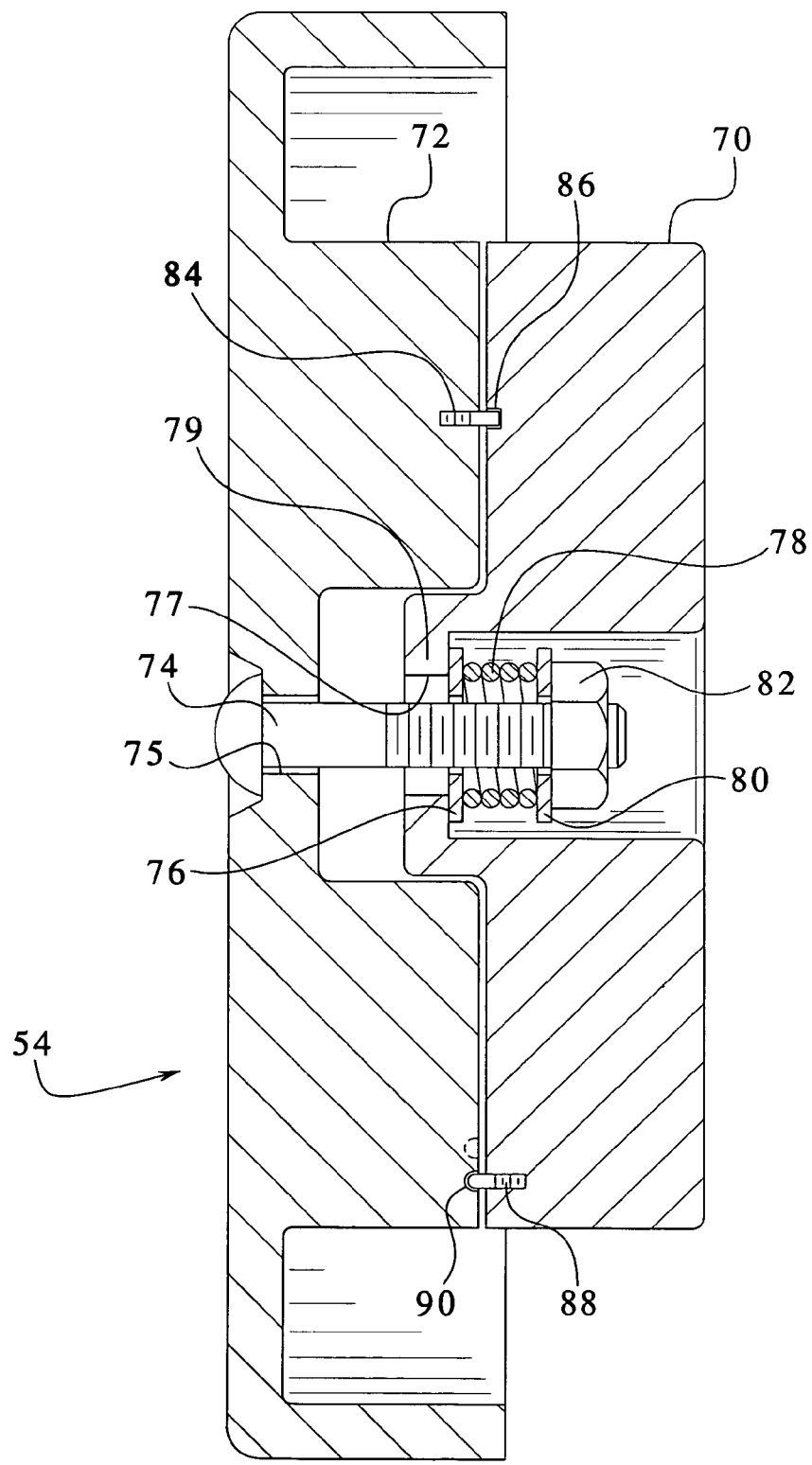
FIG. 14 is a cross-sectional view of an alternative embodiment of the present invention.

The expander 54 further includes a suitable releasable locking assembly or mechanism adapted to releasably lock the expanding member 70 relative to the base 72 in each of the positions including the non-expanded position, the fully expanded position, and the partially expanded positions. In the illustrated embodiment, the releasable locking assembly or mechanism includes a locking member or pin 88 and a plurality of locking receptacles or notches 90a to 90q each adapted to receive the locking pin 88. In one embodiment, the locking pin 88 is a ball nosed spring loaded plunger which is biased toward the expanding member 70. In the illustrated embodiment, (a) when the pin 88 is in receptacle 90a (as in FIG. 10), the expanding member is in the fully expanded position, (b) when the pin 88 is in the receptacle 90q (as in FIG. 9), the expanding member is in the non-expanded position, and (c) when the pin 88 is in any of the receptacles 90b to 90r such as 90j, the expanding member is in a partially expanded position. FIG. 14 illustrates pin 88 extending from the expanding member 70 and the notch 90 in the base 72. It should be appreciated that other suitable locking or positioning mechanisms can be employed in the present invention. For instance, the base and the expanding member can respectively include co-acting teeth or ridges, peaks and valleys, or other locking or stopping structures. These structures can be on one or more corresponding surfaces of the base and expanding member.

To move the expanding member relative to the base, an operator uses the handle to disengage the locking pin from the locking notch by applying a transverse force (against the spring or biasing member) and then moves or rotates the expanding member in the desired direction to the desired position. The operator then releases the handle, and the biasing assembly co-acts with the spring plunger or locking pin 88 to cause the locking pin to engage the appropriate locking notch to releasably lock the engaging member relative to the base.

In one embodiment, the body, the expanding member of the expander and the handle are each made from a cast aluminum. The body, expanding member, and handle can alternatively be made from a nylon, Dicyclopentadiene, Acrylonitrile-butadine-styrene or polycarbonate. It should further be appreciated that the entire supplemental restraint including the body, expander and handle could be made from any one or more suitable materials, including other metals, plastics, ceramics and composite materials or combinations thereof.

In one embodiment, the body including the mounting member, tire engager and the base of the expander are integrally formed. It should be appreciated that one or more of these members could be separately formed and suitably connected to the other members.

It should also be appreciated that the supplemental restraint 50 is preferably used with each primary restraint system which is employed to secure the vehicle in place. For certain vehicles, only two primary restraints and two supplemental restraints (on opposing tires on opposite sides of the vehicle) are employed and, for most vehicles, four primary restraints and four supplemental restraints are employed (i.e., one for each tire).

It should also be appreciated that when the movable adjusting or expanding member is moved from the non-expanded position to the fully expanded position (or one of the intermediate expanded positions) the mounting member and the tire engager of the supplemental restraint move closer to the tire, thereby, eliminating any gap, space or slack between the tire and the tire engager as illustrated in FIGS. 5 and 6.

It should thus be appreciated that in one embodiment, the present invention includes the combination of the primary restraint and the supplemental restraint. It should further be appreciated that in one embodiment, the present invention includes the combination of the primary restraint, the grating and the supplemental restraint.

It should further be appreciated that the present invention includes a method of securing a vehicle in an auto-rack railroad car which includes placing a tire engaging member and a primary restraint engaging member between a tire and a primary restraint and expanding or moving at least one of said members away from the other member to engage the tire and the primary restraint.

It should further be appreciated that the supplemental restraint of the present invention may be adapted to be used in conjunction with a primary restraint in other transport mechanism besides auto rack railroad cars.

It should be appreciated that, when not in use, the supplemental restraints can be stored in a suitable storage box or rack.

It will be understood that modifications and variations may be effected without departing from the scope of the novel concepts of the present invention, and it is understood that this application is to be limited only by the scope of the claims.

The invention is claimed as follows:

1. An auto-rack railroad car supplemental restraint for an auto-rack railroad car having a primary restraint system for a vehicle, said primary restraint system including a grating and a primary restraint releasably attachable to the grating, said supplemental restraint comprising:
  a tire engager positionable between a tire of the vehicle on the grating and the primary restraint; and
  an expander connected to the tire engager, said expander including:
    (i) a base connected to the tire engager, and
    (ii) an expanding member connected to the base, said expanding member movable to a non-expanded position relative to the base and moveable to an expanded position relative to the base, wherein when the supplemental restraint is positioned between said tire and said primary restraint, movement of the expanding member into the expanded position causes the tire engager to securely engage the tire and the expander to securely engage the primary restraint.

2. The supplemental restraint of claim 1, wherein the tire engager is formed with a curvature for engaging the tire.

3. The supplemental restraint of claim 1, which includes at least one handle connected to the expanding member.

4. The supplemental restraint of claim 1, wherein the expanding member is biasingly connected to the base.

5. The supplemental restraint of claim 1, wherein the expander includes a locking mechanism operable to releasably lock the expanding member in the expanded position.

6. The supplemental restraint of claim 5, wherein the locking mechanism includes co-acting locking notches and locking members.

7. The supplemental restraint of claim 1, which includes a mounting member configured to be positioned on the grating, said tire engager extending from the mounting member.

8. The supplemental restraint of claim 1, wherein the tire engager is removably positionable between the tire and the primary restraint.

9. An auto-rack railroad car supplemental restraint for an auto-rack railroad car having a primary restraint system for a vehicle, said primary restraint system including a grating and a primary restraint releasably attachable to the grating, said supplemental restraint comprising:
   a tire engager positionable between a tire of the vehicle on the grating and the primary restraint; and
   an expander connected to the tire engager, said expander including:
      (i) a base connected to the tire engager, and
      (ii) an expanding member connected to the base, said expanding member movable to a non-expanded position relative to the base and moveable to each of a plurality of different expanded positions relative to the base, wherein when the supplemental restraint is positioned between said tire and said primary restraint, movement of the expanding member into one of the expanded positions causes the tire engager to securely engage the tire and the expander to securely engage the primary restraint.

10. The supplemental restraint of claim 9, wherein the tire engager is formed with a curvature for engaging the tire.

11. The supplemental restraint of claim 9, which includes at least one handle connected to the expanding member.

12. The supplemental restraint of claim 9, wherein the expanding member is biasingly connected to the base.

13. The supplemental restraint of claim 9, wherein the expander includes a locking mechanism operable to releasably lock the expanding member in each of the expanded positions.

14. The supplemental restraint of claim 13, wherein the locking mechanism includes co-acting locking notches and locking members.

15. The supplemental restraint of claim 9, which includes a mounting member configured to be positioned on the grating, said tire engager extending from the mounting member.

16. The supplemental restraint of claim 9, wherein the tire engager is removably positionable between the tire and the primary restraint.

17. An auto-rack railroad car supplemental restraint for an auto-rack railroad car having a primary restraint system for a vehicle, said primary restraint system including a grating and a primary restraint releasably attachable to the grating, said supplemental restraint comprising:
   a tire engager positionable between a tire of the vehicle on the grating and the primary restraint; and
   an expander connected to the tire engager, said expander movable to each of a non-expanded position and an expanded position, wherein when the supplemental restraint is positioned between said tire and said primary restraint, the positioning of the expander in the expanded position causes the tire engager to be further away from the primary restraint, the tire engager to securely engage the tire, and the expander to securely engage the primary restraint.

18. The supplemental restraint of claim 17, wherein the tire engager is formed with a curvature for engaging the tire.

19. The supplemental restraint of claim 17, which includes at least one handle connected to the expander.

20. The supplemental restraint of claim 17, wherein the expander is biasingly connected to the tire engager.

21. The supplemental restraint of claim 17, which includes a locking mechanism operable to releasably lock the expander in the expanded position.

22. The supplemental restraint of claim 21, wherein the locking mechanism includes co-acting locking notches and locking members.

23. The supplemental restraint of claim 17, which includes a mounting member configured to be positioned on the grating, said tire engager extending from the mounting member.

24. The supplemental restraint of claim 17, wherein the tire engager is removably positionable between the tire and the primary restraint.

25. An auto-rack railroad car supplemental restraint for an auto-rack railroad car having a primary restraint system for a vehicle, said primary restraint system including a grating and a primary restraint releasably attachable to the grating, said supplemental restraint comprising:
   a tire engager positionable between a tire of the vehicle on the grating and the primary restraint; and
   an expander connected to the tire engager, said expander movable to each of a non-expanded position, at least one partially expanded position and an expanded position, wherein when the supplemental restraint is positioned between said tire and said primary restraint, the positioning of the expander in one of the expanded positions causes the tire engager to be further away from the primary restraint, the tire engager to securely engage the tire and the expander to securely engage the primary restraint.

26. The supplemental restraint of claim 25, wherein the tire engager is formed with a curvature for engaging the tire.

27. The supplemental restraint of claim 25, which includes at least one handle connected to the expander.

28. The supplemental restraint of claim 25, wherein the expander is biasingly connected to the tire engager.

29. The supplemental restraint of claim 25, which includes a locking mechanism operable to releasably lock the expander in the expanded position.

30. The supplemental restraint of claim 29, wherein the locking mechanism includes co-acting locking notches and locking members.

31. The supplemental restraint of claim 25, which includes a mounting member configured to be positioned on the grating, said tire engager extending from the mounting member.

32. The supplemental restraint of claim 25, wherein the tire engager is removably positionable between the tire and the primary restraint.

33. An auto-rack railroad car supplemental restraint for an auto-rack railroad car having a primary restraint system for a vehicle, said primary restraint system including a grating and a primary restraint releasably attachable to the grating, said supplemental restraint comprising:
   a tire engager positionable between a tire of the vehicle on the grating and the primary restraint;
   an expander including:
      (a) a base connected to the tire engager,
      (b) an expanding member connected to the base, said expanding member positionable in each of a non-expanded position relative to the base and an expanded position relative to the base, and
      (c) a locking mechanism operable to releasably lock the expanding member in said expanded position relative to the base; and
   at least one handle connected to the expanding member.

34. The supplemental restraint of claim 33, wherein the tire engager is formed with a curvature for engaging the tire.

35. The supplemental restraint of claim 33, wherein the expanding member is biasingly connected to the base.

36. The supplemental restraint of claim 33, wherein the locking mechanism includes co-acting locking notches and locking members.

37. The supplemental restraint of claim 33, which includes a mounting member configured to be positioned on the grating, said tire engager extending from the mounting member.

38. The supplemental restraint of claim 33, wherein the tire engager is removably positionable between the tire and the primary restraint.

39. An auto-rack railroad car supplemental restraint for an auto-rack railroad car having a primary restraint system for a vehicle, said primary restraint system including a grating and a primary restraint releasably attachable to the grating, said supplemental restraint comprising:
   a tire engager positionable between a tire of the vehicle on the grating and the primary restraint;
   an expander including:
      (a) a base connected to the tire engager,
      (b) an expanding member connected to the base, said expanding member positionable in each of a non-expanded position relative to the base, at least one partially expanded position relative to the base, and a fully expanded position relative to the base, and
      (c) a locking mechanism operable to releasably lock the expanding member in each said expanded position relative to the base; and
   at least one handle connected to the expanding member.

40. The supplemental restraint of claim 39, which includes a plurality of partially expanded positions, said expanding member positionable in each of said partially expanded positions relative to the base, wherein the locking mechanism is also operable to releasably lock the expanding member in each said partially expanded position.

41. The supplemental restraint of claim 39, wherein the expanding member is biasingly connected to the base.

42. The supplemental restraint of claim 39, wherein the locking mechanism includes co-acting locking notches and locking members.

43. The supplemental restraint of claim 39, which includes a mounting member configured to be positioned on the grating, said tire engager extending from the mounting member.

44. The supplemental restraint of claim 39, wherein the tire engager is removably positionable between the tire and the primary restraint.

45. An auto-rack railroad car supplemental restraint for an auto-rack railroad car having a primary restraint system for a vehicle, said primary restraint system including a grating and a primary restraint releasably attachable to the grating, said supplemental restraint comprising:
   a tire engaging member;
   a primary restraint engaging member; and
   expanding means for causing the tire engaging member and the primary restraint engaging member to be positioned further apart from each other such that when the supplemental restraint is positioned between the tire on the grating and the primary restraint, the tire engaging member securely engages the tire of the vehicle on the grating and the primary restraint engaging member securely engages the primary restraint on the grating.

46. The supplemental restraint of claim 45, wherein the tire engaging member is formed with a curvature for engaging the tire.

47. The supplemental restraint of claim 45, wherein the expanding means includes at least one handle.

48. The supplemental restraint of claim 45, wherein the expanding means includes locking means for releasably locking the tire engaging member and the primary restraint engaging member further apart from each other.

49. The supplemental restraint of claim 45, wherein the locking means includes co-acting locking notches and locking members.

50. The supplemental restraint of claim 45, which includes a mounting member configured to be positioned on the grating, said tire engager extending from the mounting member.

51. The supplemental restraint of claim 45, wherein the tire engager is removably positionable between the tire and the primary restraint.

* * * * *